United States Patent

Banyas et al.

Patent Number: 5,818,204
Date of Patent: Oct. 6, 1998

[54] BATTERY CHARGING METHODS AND APPARATUSES

[75] Inventors: Timothy Banyas, Apex, N.C.; Bjorn Frannhagen, Lund, Sweden

[73] Assignee: Ericsson Inc., Research Triangle Park, N.C.

[21] Appl. No.: 770,897

[22] Filed: Dec. 20, 1996

Related U.S. Application Data

[60] Provisional application No. 60/026,347 Sep. 19, 1996.
[51] Int. Cl.$^6$ ........................................ H02J 7/04
[52] U.S. Cl. ................................. 320/150; 320/153
[58] Field of Search ..................... 320/5, 13, 14, 320/22, 31, 35, 36, 37, 150, 153, 155, 104, 102, 103, 121, 130, 134, 135, 136

[56] References Cited

U.S. PATENT DOCUMENTS

| | | | |
|---|---|---|---|
| 5,013,993 | 5/1991 | Bhagwat et al. | 320/35 |
| 5,519,302 | 5/1996 | Mino et al. | 320/35 X |
| 5,627,451 | 5/1997 | Takeda | 320/35 X |
| 5,642,032 | 6/1997 | Kokuga | 320/22 |

*Primary Examiner*—Peter S. Wong
*Assistant Examiner*—Gregory J. Toatley, Jr.
*Attorney, Agent, or Firm*—Burns, Doane, Swecker & Mathis, L.L.P.

[57] ABSTRACT

Techniques for controlling the charging of batteries and portable electronic devices are described. In order to avoid inclusion of a temperature sensing element within a battery pack, various techniques are described that control charging of the battery with respect to its temperature. For example, when the portable electronic device is powered on, a timer may begin counting which, after a predetermined time period, will allow an external charging device to charge the battery. Alternatively, if a temperature sensing element is provided within the device for monitoring the temperature of some other element, its monitored temperature may also be taken into account in determining when the battery is within a safe temperature range for charging. A temperature gradient measured by the temperature sensing element within the device may also be considered to counteract the impact of drastic temperature differences between the battery and the device itself.

18 Claims, 7 Drawing Sheets

BATTERY CHARGING METHODS AND APPARATUSES

BACKGROUND

The present invention relates generally to battery charging techniques and, more particularly, to battery charging techniques for charging batteries used to power radiocommunication terminals.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing the next generation technology. Furthermore, it is widely believed that the first generation of Personal Communication Networks (PCNs), employing low cost, pocket-sized, cordless telephones that can be carried comfortably (e.g., in a shirt pocket) and used to make or receive calls in the home, office, street, car, etc., will be provided by, for example, cellular carriers using the next generation digital cellular system infrastructure. One of the greatest challenges associated with the continuing miniaturization of portable terminals used in radiocommunication systems involves providing an adequate portable power supply which is as small as possible.

A battery pack is typically the main power source for these, and other, portable electronic devices, e.g., cellular phones and portable computers. Batteries are, however, relatively delicate devices that require careful handling, particularly during recharging. It is known that in order to avoid damage, batteries should typically be charged only when within a predetermined temperature range, e.g., 5–45 degrees Celsius. Otherwise, the performance and life cycle of the batteries may be seriously degraded. Accordingly, many electronic devices provide mechanisms for monitoring the temperature of a battery to avoid charging the battery outside of its preferred temperature range.

Conventionally, the battery's temperature was monitored directly using a temperature sensing device to ascertain the precise temperature of the battery before charging. For example, a thermistor placed near or in contact with the battery was used to relay temperature information to a processor in the device (e.g., cellular phone) powered by the battery. Then, the processor could control charging so that the battery was only charged while in the preferred temperature range.

However, use of a thermistor inside the battery pack is expensive and renders the mechanical design of the battery pack more complex, e.g., because an electrical contact is needed for the thermistor. Accordingly, it would be desirable to eliminate this component. In some portable devices, other temperature sensing devices are provided to monitor the temperature of other components. For example, in some portable radiocommunication devices, temperature sensing elements are provided proximate the power amplifier to monitor heating of this component.

However, trying to use these existing temperature sensing devices to indirectly monitor the temperature of the battery raises other problems. For example, if a hot battery is connected to a cold phone, then the temperature relayed by a temperature sensing element inside the phone may be significantly less than that of the battery. Conversely, if a cold battery is connected to a hot phone, then the temperature relayed by the temperature sensing element inside the phone may be significantly higher than that of the battery. Accordingly, it would be desirable to provide mechanisms and techniques for monitoring the temperature of a battery to prevent the battery from being charged while it is too hot or too cold, but without the usage of a dedicated temperature sensing element inside the battery pack which raises the cost and complexity of the device.

SUMMARY

These, and other, problems, drawbacks and limitations of conventional mechanisms and techniques for controlling the charging of batteries in electronic devices are overcome according to the present invention, wherein techniques are provided that control the charging of a battery either without the usage of any temperature sensing elements or by using temperature sensing elements that are incorporated into the electronic devices for other purposes and which do not directly measure the temperature of the battery. According to a first exemplary embodiment, when the electronic device is powered on, a timer begins counting. When the timer reaches a predetermined time, e.g., ten minutes, a control device will then allow an externally connected charging device to charge the battery.

According to another exemplary embodiment of the present invention, a temperature sensing element which is provided to monitor the temperature of other elements within the electronic device can also be used to assist in determining when it is safe to charge the battery. For example, a timer can be initiated when the device is powered on. After some predetermined time period, e.g., three minutes, the temperature sensing element can be used to indicate a temperature associated with the electronic device. If the measured temperature is within a predetermined range, then the processor or other control device which is responsible for controlling charging of the battery will allow charging based on the assumption that the battery temperature is similar to the device temperature after the predetermined time period.

According to yet another exemplary embodiment of the present invention, the temperature gradient can be taken into consideration by the control device when determining whether or not to allow charging of the battery. For example, if the temperature gradient is too high, then the control device will not allow charging of the battery regardless of a temperature associated with the device itself. If, on the other hand, the temperature gradient is within a predetermined limit, then the control device can check the temperature monitored by the temperature sensing element. If this temperature is also within predetermined limits, at this point the control device will allow the externally connected charger to charge the battery. In this way, drastic differences between the temperature of the battery and the temperature of the electronic device can be accounted for.

BRIEF DESCRIPTION OF THE DRAWINGS

These, and other, objects, features and advantages of the present invention will become more readily apparent to those skilled in the art upon reading the following detailed description, in conjunction with the appended drawings, in which.

DETAILED DESCRIPTION

Those skilled in the art will readily appreciate that the present invention is applicable to any and all devices which use batteries that are rechargeable, including, for example, mobile phones and portable computers. However, for the purposes of illustration, rather than limitation, the following discussion provides examples which illustrate application of the present invention in the area of mobile phones. Accordingly, prior to describing battery charging techniques according to the present invention, a brief description of cellular radiocommunication systems is provided below for context.

Figure 1:
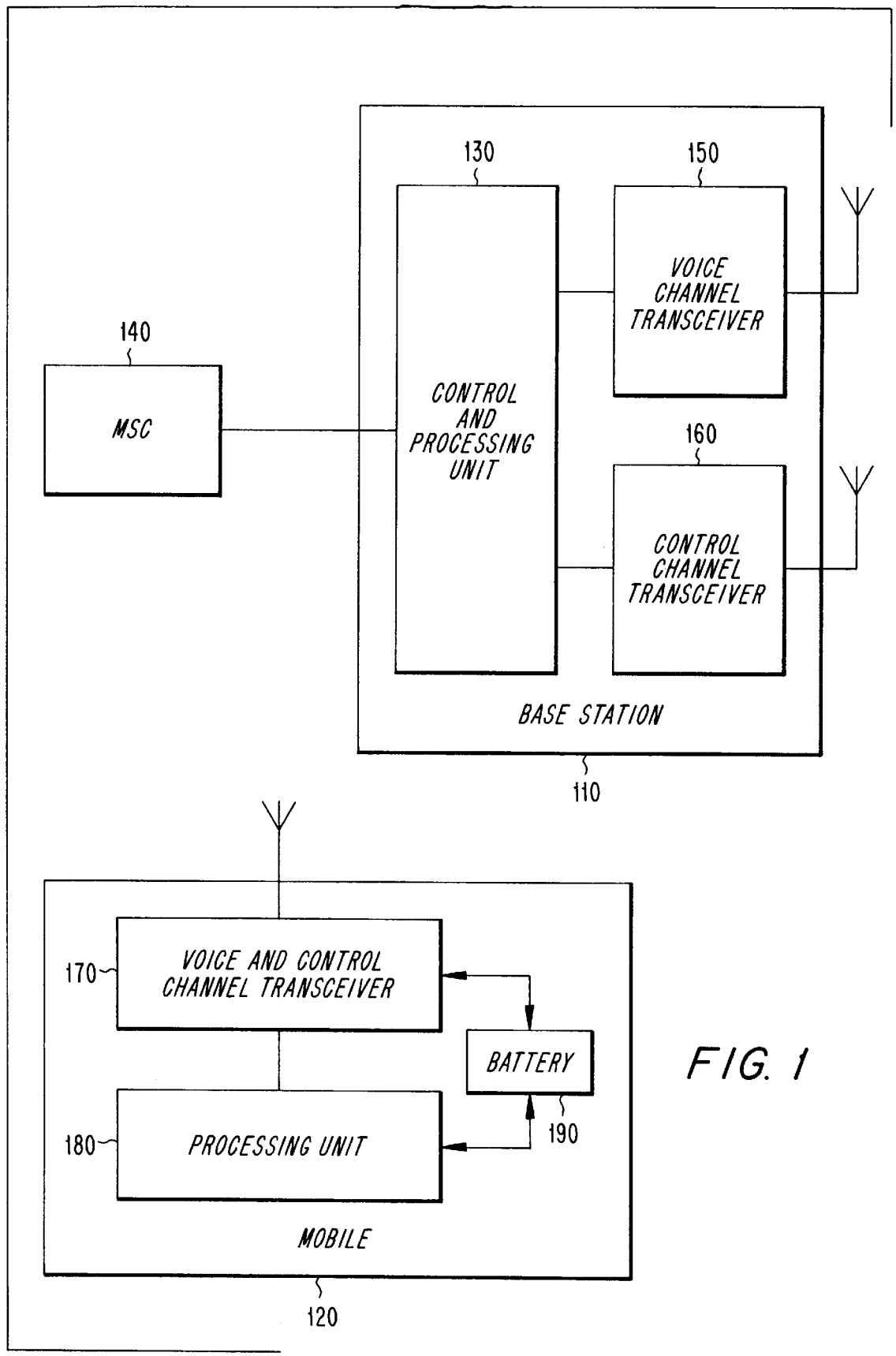
FIG. 1 is a block diagram illustrating exemplary components of a radiocommunication system including a mobile station and a base station.

FIG. 1 represents a block diagram of an exemplary cellular radiocommunication system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. patent application Ser. No. 07/967,027 entitled "Multi-mode Signal Processing," which was filed on Oct. 27, 1992, both of which are incorporated in this application by reference.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. More significantly, from the perspective of the present invention, the processing unit 180 also controls the charging of the mobile station's battery 190. The mobile station 120 includes a thermistor (not shown) proximate the power amplifier (not shown) for monitoring, for example, the temperature of the power amplifier. The structures and techniques used for charging this battery according to the present invention can also use this thermistor for another purpose, which techniques will now be described.

Figure 2:
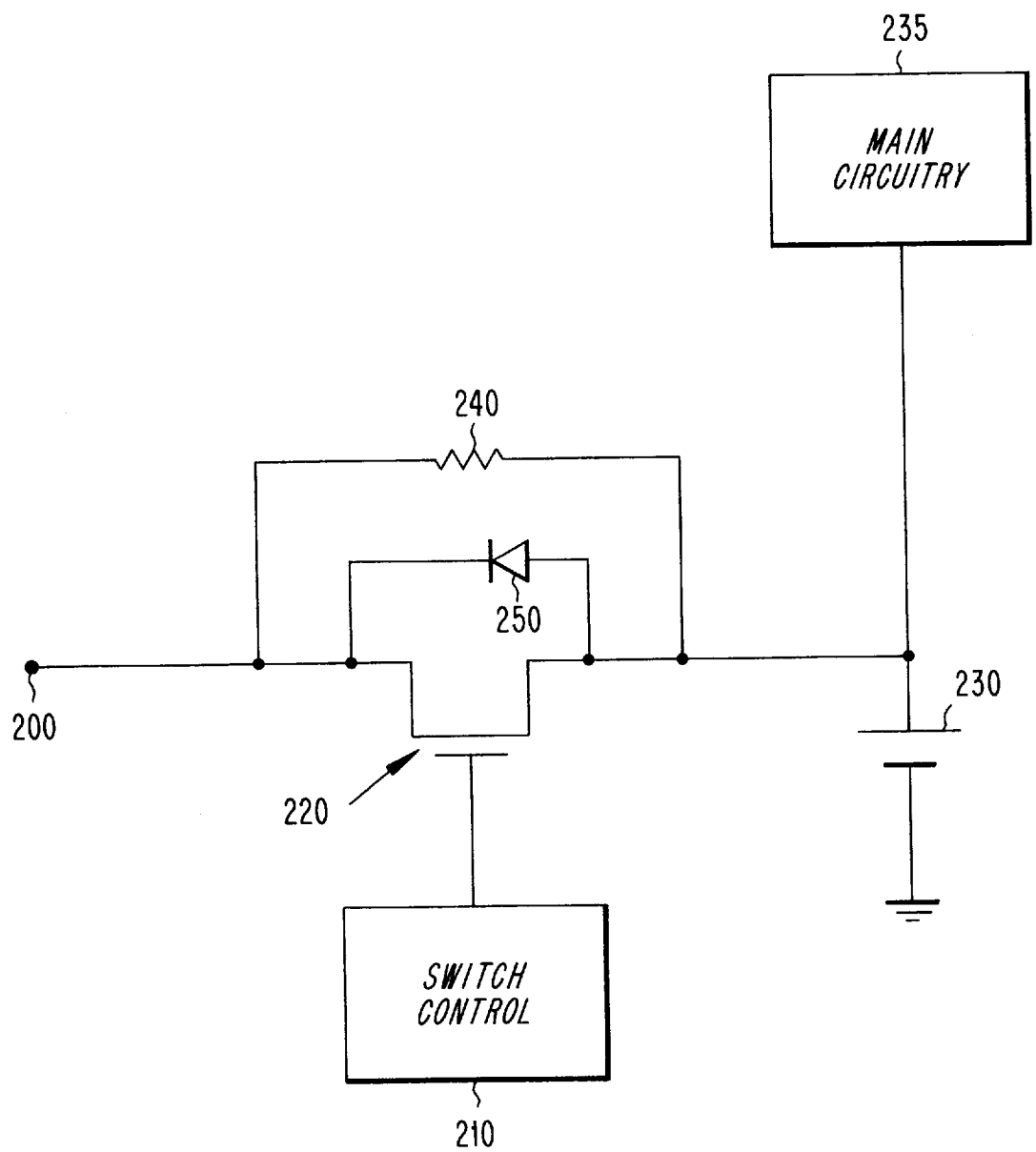
FIG. 2 illustrates a charging portion of a portable electronic device according to the present invention.

A portion of an exemplary electronic device (e.g., mobile phone or station) according to the present invention is illustrated in FIG. 2, which shows a charging port 200 to which an external charging device (not shown) can be attached. Switch control logic 210 (which may include processing unit 180) selectively triggers MOSFET 220 into a conductive mode whereupon charging current from the external charging device is permitted to charge battery 230. If the battery voltage is too low, then the device may not be able to power on, in which case control logic 210 cannot trigger MOSFET 220. In such a case, trickle resistor 240 provides an alternative charging path, by way of which battery 230 can charge sufficiently to allow the device to power on and switch to a normal charging mode. Diode 250 provides a reverse path for current to flow to a connected accessory, if desired. Having described the charging circuitry generally, exemplary techniques by which control logic 210 selectively triggers MOSFET 220 will now be described beginning with FIG. 3.

Figure 3:
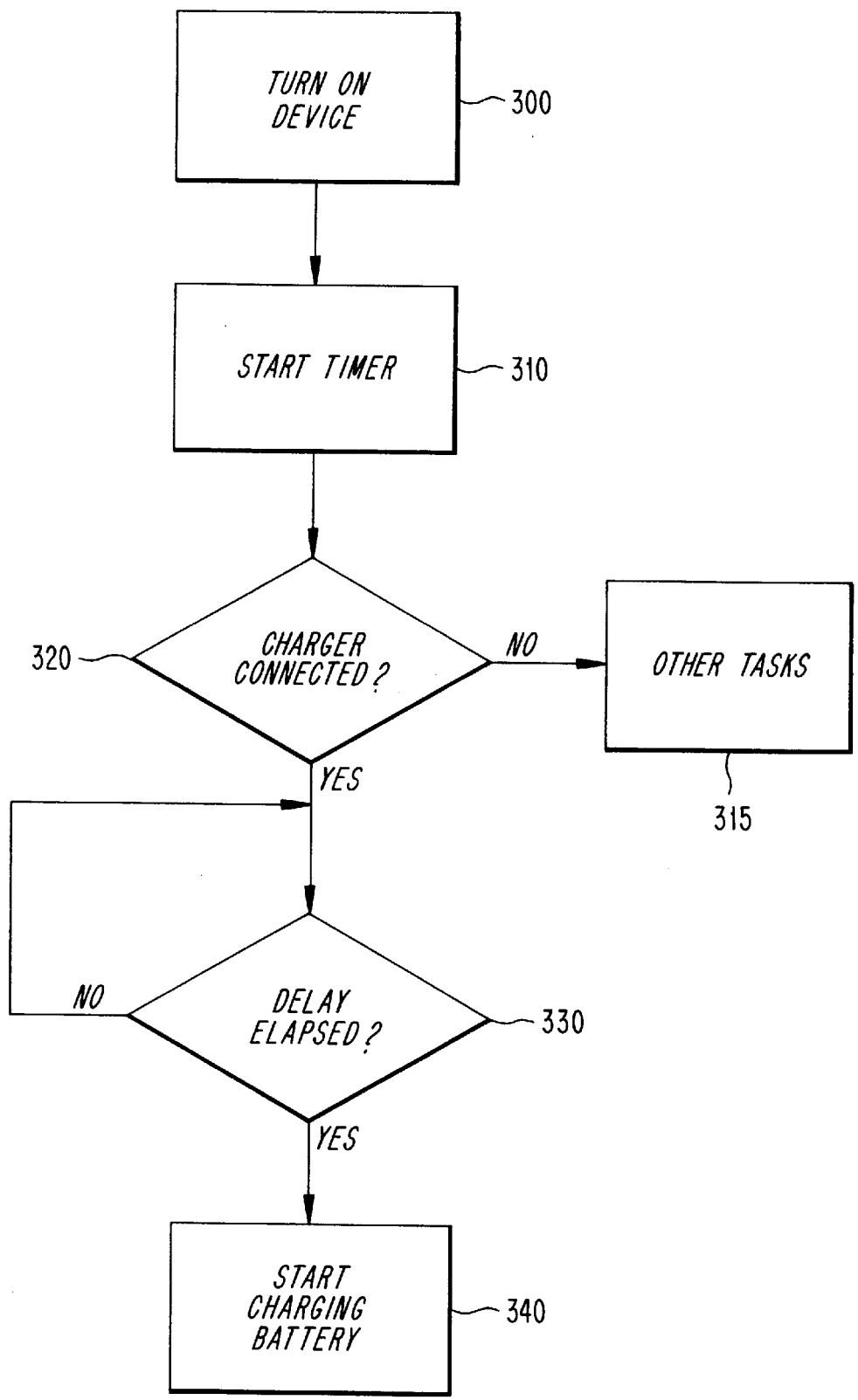
FIG. 3 is a flowchart illustrating an exemplary technique for charging a battery according to a first exemplary embodiment of the present invention.

FIG. 3 is a flowchart illustrating a first exemplary embodiment of the present invention. According to this exemplary embodiment, no temperature sensing element is needed to determine an appropriate time to begin charging. Instead, after the device (e.g., mobile station) is turned or powered on at block 300, a timer commences counting at step 310. If no charging device is connected, then the flow proceeds on to other tasks, e.g., listening for paging messages, at step 315. If a charging device is connected to the device, as determined at step 320, then the amount of time which has elapsed since the unit was turned on is checked at step 330. If the amount of time counted by timer 310 is greater than some predetermined period of time, e.g., 10 minutes, then the processing unit 180 (or switch control 210) will allow current from the charging device to be used to charge the battery at step 340. Otherwise, the processor waits until this delay period expires as shown by the "NO" path looping back from decision block 330.

Thus, this exemplary embodiment relies on the fact that the battery is unlikely to remain too hot or too cold after the device is operating for some predetermined period of time, e.g., 10 minutes, and delays charging for that long. In this way, no special temperature sensing circuitry is needed to monitor the battery.

As mentioned above, some portable electronic devices may include a temperature sensing device, e.g., a thermistor, which is used to monitor the temperature of circuitry other than the battery, e.g., a power amplifier in a mobile station. If available, this temperature sensing device can be used by other exemplary embodiments of the present invention to help determine when it is safe to charge the battery and reduce the delay time described above.

Figure 4:
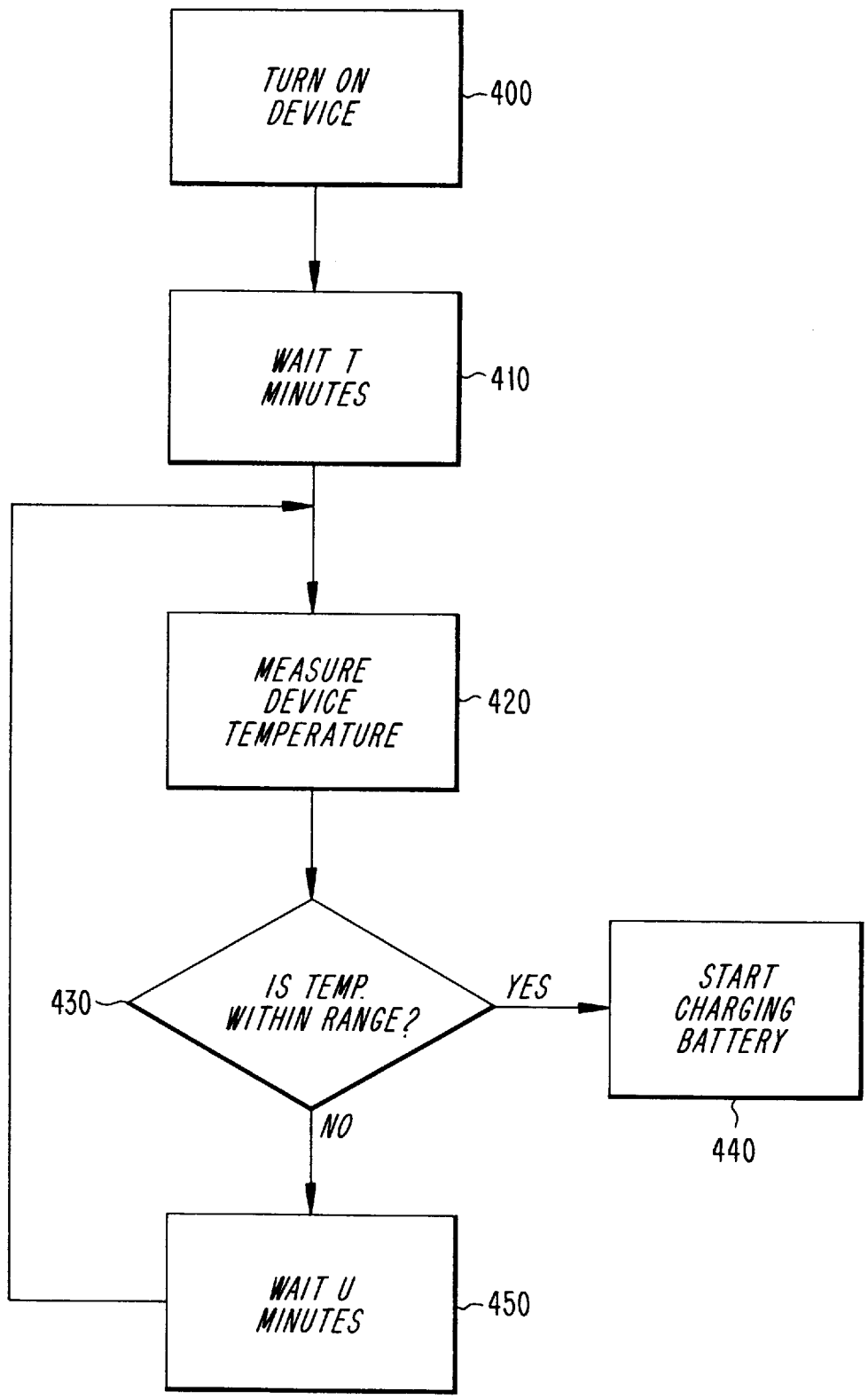
FIG. 4 is a flowchart illustrating an exemplary technique for charging a battery according to a second exemplary embodiment of the present invention.

Referring to FIG. 4, after the device is powered on (step 400), the processing unit again waits some predetermined period, e.g., T minutes, before allowing charging of the battery as shown by step 410. This period T can be less than the period described for the first exemplary embodiment, e.g., three minutes or five minutes. After this period of time has elapsed, the processor then uses the thermistor inside the device (but not inside the battery pack which device is omitted according to the present invention) to measure the ambient temperature of the device at step 420. If the measured temperature is within a desired range, e.g., 5–45 degrees Celsius, then the processing unit allows the battery to start charging, e.g., by closing MOSFET switch 220. Thus, the processing unit assumes that the battery temperature is about the same as the device temperature after a predetermined time period T, which can be less than 10 minutes. If the temperature is determined to be outside the range, then the flow proceeds to block 450 wherein the processing unit waits for some period of time e.g., 1 minute or 7 minutes, before measuring the device temperature again and performing another iteration.

Figure 5A:
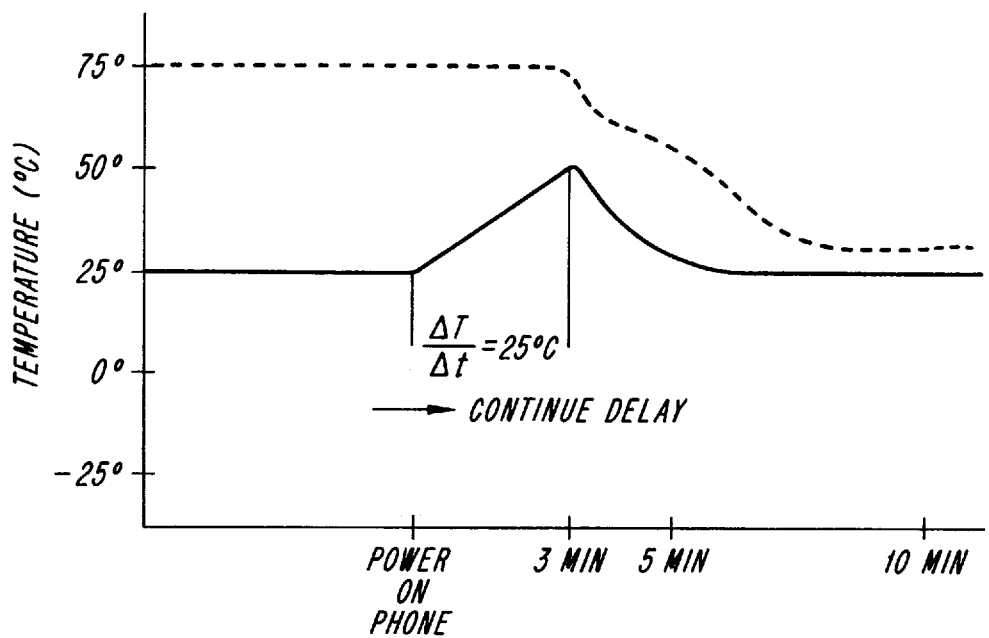
FIG. 5A is a graph illustrating battery temperature as compared with device temperature under a first exemplary set of conditions.

In addition to measuring the device temperature itself, another parameter can be considered by the processing unit when determining whether the battery is likely to be within an acceptable temperature range for charging. Specifically, the processing unit can consider the temperature gradient or rate of change of the device temperature. This parameter may be useful when dealing with situations where the temperature of the device and the battery are very different. Consider, for example, a hot battery (e.g., on the order of 75 degrees Celsius) that is inserted into a cooler device (e.g., on the order of 25 degrees Celsius) as shown in FIG. 5A. As shown in the Figure, the temperature of the device will rise relatively rapidly, e.g., about 25 degrees Celsius over three minutes while the battery will cool off somewhat more slowly. In this type of situation, it is possible that the device temperature might remain within the desired battery temperature range, even though the battery itself is not. By noting the rapid increase in the rate of temperature increase of the device, rather than solely relying on the absolute temperature of the device as an indicator of battery temperature, the processing unit can avoid incorrectly deciding to allow battery charging in these situations.

Figure 5B:
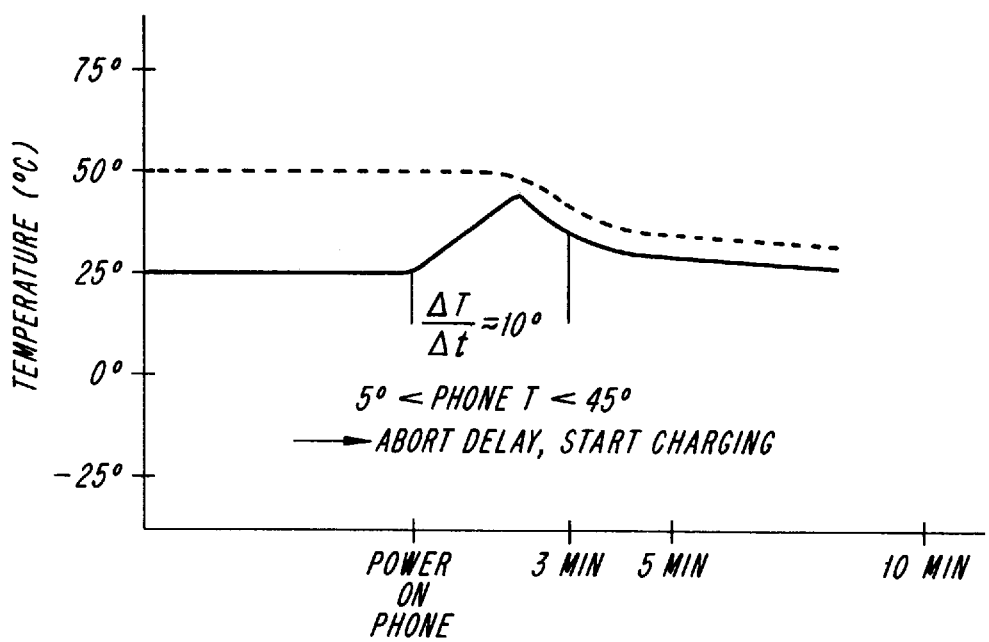
FIG. 5B is a graph illustrating battery temperature as compared with device temperature under a second exemplary set of conditions.

FIG. 5B shows another example where the initial battery temperature is about 50 degrees Celsius and the device temperature is about 25 degrees Celsius. Since the temperature difference in this situation is less than in the example described above with respect to FIG. 5A, the temperature gradient is also less. Thus, after three minutes it would be safe to begin charging the battery under these conditions.

Figure 5C:
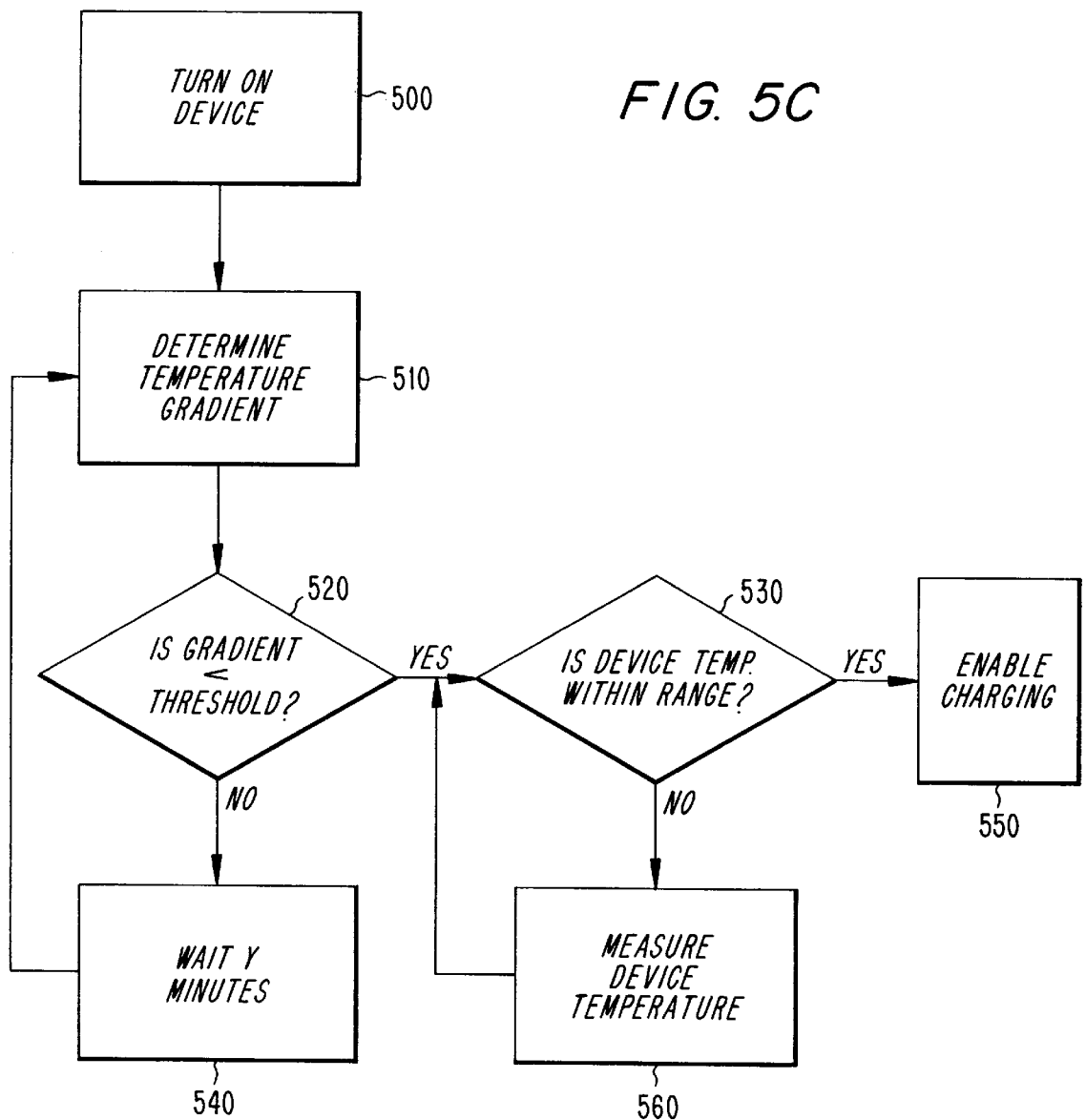
FIG. 5C is a flowchart illustrating battery charging according to a third exemplary embodiment of the present invention.

Temperature gradient information can be used to determine an appropriate time to begin charging as shown in FIG. 5C. After the device is turned on at block 500, the temperature gradient can be determined at block 510. This step will be described in more detail below with respect to FIG. 6. If the determined temperature gradient is less than some threshold (e.g., 10 degrees Celsius over three minutes or 15 degrees Celsius over three minutes), as evaluated at block 520, then the processing unit will consider the most recently measured temperature of the device at block 530 (again using a temperature sensing element, e.g., a thermistor, which was originally provided in the device for some other temperature sensing purpose and does not directly measure the temperature of the battery) as an indication of the battery temperature. That is, if the change in the device temperature over a period of time is not too drastic, then the device's current temperature is considered to be a sufficiently accurate measurement of the battery temperature. Otherwise, if the gradient exceeds the threshold, then the processing unit waits some period of time, e.g.., Y minutes, before performing another iteration at block 540.

As in the previous exemplary embodiment, once the gradient threshold criteria has been satisfied, the processing unit also checks whether the device temperature is within the acceptable range at block 530. If so, then charging is enabled at step 550. Otherwise, the processing unit waits to take another temperature measurement as shown by block 560.

Figure 6:
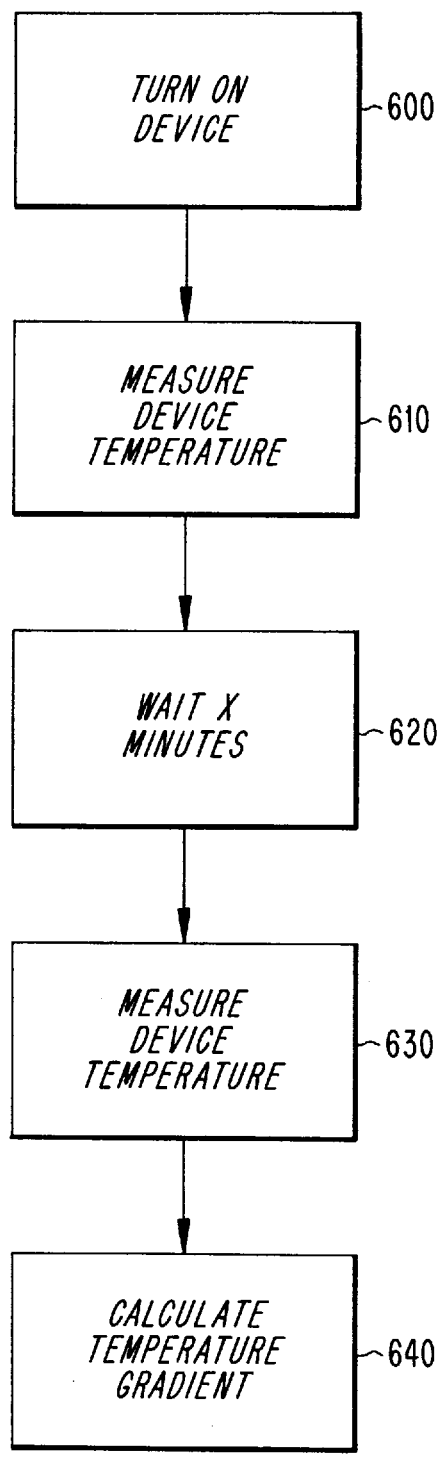
FIG. 6 is a flowchart illustrating a portion of the technique described in FIG. 5C in more detail.

FIG. 6 illustrates an exemplary technique for determining the gradient at step 510. Once the device is turned on at step 600, a first device temperature measurement is taken at step 610. Then the processing unit waits some period of time X, e.g., 3 minutes, before taking a second temperature measurement at blocks 620 and 630. The temperature gradient is then calculated at step 640 as the difference in the two measured temperatures (divided by the time).

Other features are also contemplated according to the present invention. For example, although processing unit 180 may not allow the battery to be charged if it is too hot or too cold, the external charging device can still be used during this waiting period to power the device's other components. This can be accomplished by opening switch 220 at a duty cycle which is sufficient to provide enough current to supply the device's other components but not enough to charge the battery. Likewise, even after the processing unit allows charging to begin, in any of the manners described above, a duty cycle can still be maintained if the external charging device supplies more current than desirable for charging the battery. For example, if the charging device supplies 900 mA and the battery is best charged at 700 mA, then the processing unit would operate the switch 220 accordingly.

The above-described exemplary embodiments are intended to be illustrative in all respects, rather than restrictive, of the present invention. Thus the present invention is capable of many variations in detailed implementation that can be derived from the description contained herein by a person skilled in the art. For example, different delay time periods can be used if the device is determined to be on the low end of the temperature range (i.e., implying that the battery is too cold for charging) than those used if the device temperature is measured to be higher than the high end of the range. All such variations and modifications are considered to be within the scope and spirit of the present invention as defined by the following claims.

What is claimed is:

1. A method for charging a battery connected as a power supply for a device comprising the steps of:

starting a timer when said device is powered on; and charging said battery only after said timer indicates that a predetermined delay time has elapsed.

2. The method of claim 1, wherein said predetermined delay time is ten minutes.

3. The method of claim 1, wherein said device is a communications terminal.

4. A method for charging a battery connected as a power supply for a device comprising the steps of:

(a) starting a timer when said device is powered on;

(b) measuring a temperature of said device after a first predetermined time period has elapsed as indicated by said timer; and (c) charging said battery if said temperature is within a predetermined range.

5. The method of claim 4, further comprising the step of:

(d) otherwise, waiting a second predetermined time period and repeating steps (b) and (c).

6. The method of claim 5, wherein said second predetermined time period is 7 minutes.

7. The method of claim 4, wherein said first predetermined time period is 3 minutes.

8. The method of claim 4, wherein said predetermined range is 5–45 degrees Celsius.

9. The method of claim 4, wherein said device is a communications terminal.

10. A method for charging a battery connected as a power supply for a device comprising the steps of:

determining a device temperature gradient based upon a first and a second temperature;

comparing said gradient to a threshold gradient; and commencing charging of said battery based on a result of said comparing step.

11. The method of claim 10, wherein said step of commencing charging of said battery further comprises the steps of:

- determining if said second temperature is within a predetermined range; and
- commencing charging of said battery if said gradient is below said threshold gradient and if said temperature is within said predetermined range.

12. The method of claim 11, wherein said threshold gradient is 15 degrees Celsius over three minutes and said predetermined range is 5–45 degrees Celsius.

13. A communications terminal comprising:

- a battery for supplying power to said communications terminal;
- a processor for commencing charging of said battery by allowing said battery to be charged only after said communications terminal has been powered on for at least a predetermined time period.

14. The communications terminal of claim 13, wherein said predetermined time period is 10 minutes.

15. The communications terminal of claim 13 further comprising:

- a temperature sensing device for sensing a temperature of said communications terminal after said predetermined time period has elapsed;
- wherein said processor compares said sensed temperature with a predetermined range of temperatures and allows said battery to be charged if said sensed temperature is within said range of temperatures.

16. The communications terminal of claim 15, wherein said predetermined period of time is 3 minutes and said range of temperatures is between 5 and 45 degrees Celsius.

17. The communications terminal of claim 13 further comprising:

- a temperature sensing device for sensing an initial temperature of said communications terminal and a second temperature after said predetermined time period has elapsed;
- wherein said processor determines a temperature gradient from said initial temperature and said second temperature and allows said battery to be charged if said temperature gradient is less than a threshold and if said second temperature is within a predetermined range.

18. The communications terminal of claim 17, wherein said threshold is 15 degrees Celsius over three minutes and said predetermined range is 5–45 degrees Celsius.

* * * * *